United States Patent
Iyama et al.

(10) Patent No.: US 8,847,863 B2
(45) Date of Patent: Sep. 30, 2014

(54) LIQUID CRYSTAL DISPLAY DEVICE

(75) Inventors: Yuichi Iyama, Osaka (JP); Akira Shibazaki, Osaka (JP); Yoshito Hashimoto, Osaka (JP); Masahiro Shimizu, Osaka (JP); Hiroshi Tsuchiya, Osaka (JP); Yusuke Nishihara, Osaka (JP); Ken Kuboki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 127 days.

(21) Appl. No.: 13/577,987

(22) PCT Filed: Dec. 20, 2010

(86) PCT No.: PCT/JP2010/072931
§ 371 (c)(1),
(2), (4) Date: Aug. 9, 2012

(87) PCT Pub. No.: WO2011/102052
PCT Pub. Date: Aug. 25, 2011

(65) Prior Publication Data
US 2012/0306731 A1    Dec. 6, 2012

(30) Foreign Application Priority Data
Feb. 16, 2010 (JP) ................ 2010-031631

(51) Int. Cl.
*G09G 3/36* (2006.01)
*G02F 1/1362* (2006.01)
*G02F 1/1337* (2006.01)
*G02F 1/1343* (2006.01)

(52) U.S. Cl.
CPC .... *G02F 1/136213* (2013.01); *G02F 1/133707* (2013.01); *G02F 1/134363* (2013.01)
USPC .............................. 345/87; 349/39

(58) Field of Classification Search
CPC .............. G09G 2300/0421; G09G 2300/0426; G09G 2300/043; G09G 2300/0439; G09G 2300/0443; G09G 2300/0452; G09G 2300/0456; G09G 2300/046; G09G 2300/0465; G09G 2300/0876; G09G 2320/0233; G02F 1/133707; G02F 1/134363; G02F 1/136213
USPC ................. 345/87, 204; 349/38, 39, 139–142
See application file for complete search history.

(56) References Cited

U.S. PATENT DOCUMENTS 7,742,115 B2 *  6/2010  Chan et al. .............. 349/39
7,952,675 B2 *  5/2011  Kataoka et al. ......... 349/143

(Continued)

FOREIGN PATENT DOCUMENTS

JP       2003-149647 A     5/2003

(Continued)

OTHER PUBLICATIONS

Official Communication issued in International Patent Application No. PCT/JP2010/072931, mailed on Mar. 22, 2011.

*Primary Examiner* — Tom Sheng
(74) *Attorney, Agent, or Firm* — Keating & Bennett, LLP

(57) ABSTRACT

Disclosed is a liquid crystal display device of active matrix type. Each pixel electrode (1) includes either a single regional electrode (2) or two or more regional electrodes (2) which are electrically connected to each other. The or each regional electrode is provided with: a first electrode (cross-shaped electrode) (3) which has a pattern dividing a first region into a plurality of second regions (R1, R2, R3, and R4); and a plurality of stripe electrodes (4) which are provided in each of the second regions so as to extend from the first electrode and so as to be separated from each other by a distance. A storage capacitor line (CSL) is provided facing one of pixel electrodes (1) in a film thickness direction to form a storage capacitor. The storage capacitor line (CSL) is provided so as not to extend facing an edge (2e, 2e') of a first region in the film thickness direction parallelly to the edge (2e, 2e'). The invention eliminates irregular orientation of liquid crystal molecules in polymer sustained alignment.

13 Claims, 14 Drawing Sheets

(56) References Cited

U.S. PATENT DOCUMENTS

| | | | |
|---|---|---|---|
| 7,999,880 B2* | 8/2011 | Chai et al. | 349/43 |
| 2002/0008685 A1* | 1/2002 | Ban et al. | 345/92 |
| 2003/0043336 A1 | 3/2003 | Sasaki et al. | |
| 2003/0071952 A1 | 4/2003 | Yoshida et al. | |
| 2006/0098150 A1* | 5/2006 | Lee et al. | 349/141 |
| 2006/0227274 A1* | 10/2006 | Do et al. | 349/139 |
| 2007/0019144 A1* | 1/2007 | Nakanishi et al. | 349/139 |
| 2007/0024786 A1* | 2/2007 | Tanaka et al. | 349/139 |
| 2007/0026164 A1 | 2/2007 | Murata et al. | |
| 2007/0097279 A1* | 5/2007 | Sugiura | 349/38 |
| 2008/0204616 A1* | 8/2008 | Fujita | 349/39 |
| 2009/0066872 A1* | 3/2009 | Hirato | 349/46 |
| 2009/0161055 A1* | 6/2009 | Huang et al. | 349/129 |
| 2009/0190053 A1* | 7/2009 | Kito | 349/39 |
| 2009/0322695 A1* | 12/2009 | Cho et al. | 345/173 |
| 2011/0242073 A1* | 10/2011 | Horiuchi et al. | 345/204 |

FOREIGN PATENT DOCUMENTS

| | | |
|---|---|---|
| JP | 2006-215326 A | 8/2006 |
| JP | 2007-249243 A | 9/2007 |
| JP | 2009-151204 A | 7/2009 |

* cited by examiner

LIQUID CRYSTAL DISPLAY DEVICE

TECHNICAL FIELD

The present invention relates to liquid crystal display devices including pixel electrodes including a plurality of stripe electrodes separated from each other by a distance.

BACKGROUND ART

MVA (Multi-domain Vertical Alignment)-driven liquid crystal display devices are widely known which realize wide viewing angles by dividing a liquid crystal layer into domains and changing the orientation into which liquid crystal molecules tilt from one domain to the other. Some liquid crystal display devices of this type incorporate a so-called "fish bone" pixel electrode. The electrode includes a plurality of stripe electrodes formed in a pattern that runs in different directions in different domains, and the stripe electrodes act as an alignment regulator for the formation of the domains used in MVA driving.

FIG. 18 represents a pixel arrangement for the liquid crystal display device, described in Patent Literature 1, which includes pixel electrodes including a plurality of stripe electrodes.

FIG. 18 shows a pixel formed in an area surrounded by two adjacent gate lines 2302 and two adjacent data lines 2303. There is provided a Cs line 2304 parallel to the gate line 2302 so as to divide the pixel area into upper and lower halves. A pixel electrode 2311 is provided in each of the upper half area 2311a and the lower half area 2311b. The two pixel electrodes 2311 are connected to each other by a pixel electrode 2312. The upper and lower pixel electrodes 2311 each include a cross-shaped electrode and a plurality of stripe electrodes which extend at angles from the cross-shaped electrode. The stripe electrodes extend in a different direction in each of the four regions formed by the cross-shaped electrode.

In the pixel electrode including the stripe electrodes, narrow slits (gaps between the stripe electrodes) as well as the stripe electrodes act as an alignment regulator, so that liquid crystal molecules can orient in the directions of a pattern when voltage is applied across the liquid crystal layer. This feature works as follows. Referring to FIG. 19, the liquid crystal molecules LCm on the stripe electrodes 101b tilt toward a stem of the cross-shaped electrode 101a (as opposed to toward a pixel edge 101e) under the influence of an electric field generated. The liquid crystal molecules therefore tilt in four different directions, one in each domain, when voltage is applied. The feature thus results in wide viewing angles.

The alignment regulation by use of stripe electrodes and narrow slits, however, does not yield sufficient electric field for regulation of orientation; the liquid crystal molecules fail to orient in a well-organized manner if voltage is applied abruptly across the liquid crystal layer. For this reason, in the manufacturing process, the voltage applied across the liquid crystal layer is changed slowly to achieve stable alignment of the liquid crystal molecules. PVA (polymer sustained alignment) is then performed on the liquid crystal molecules in such a condition. Polymer sustained alignment is a technique to blend liquid crystal with monomer which is subsequently light-irradiated or heated for polymerization, so that the polymer can preserve the pretilt angles of the liquid crystal molecules (see, for example, Patent Literatures 2 and 3).

CITATION LIST

Patent Literature

Patent Literature 1
Japanese Patent Application Publication, Tokukai, No. 2007-249243A (published Sep. 27, 2007)
Patent Literature 2
Japanese Patent Application Publication, Tokukai, No. 2003-149647A (published May 21, 2003)
Patent Literature 3
Japanese Patent Application Publication, Tokukai, No. 2006-215326A (published Aug. 17, 2006)

SUMMARY OF INVENTION

Technical Problem

Voltage needs to be applied across the liquid crystal layer to perform polymer sustained alignment on a liquid crystal display device provided with the stripe electrodes discussed above. This may be achieved by applying voltage across the pixel electrodes and the common electrode. However, if a pixel receives no voltage because of, for example, a disconnection in the associated source bus line, the polymer sustained alignment is not performed throughout the liquid crystal layer. Voltage is preferably applied across the storage capacitor lines and the common electrode.

If the storage capacitor line is provided right under the boundary between the pixel electrodes as in the pixel shown in FIG. 18, an electric field E1 is generated which leaks from the storage capacitor line CSL into the gap between pixel electrodes 101 as shown in FIG. 20 (a cross-sectional view of the pixel in FIG. 18 taken along line A-A'). The cross-sectional view shows a liquid crystal layer LC provided between a matrix substrate and a common electrode COM. The matrix substrate is, for example, fabricated by stacking, on a glass substrate 100, storage capacitor lines CSL, an insulating film 102 including a transparent insulating film (JAS), etc., and pixel electrodes 101 including transparent electrodes (ITO), etc. in this order. As illustrated in FIG. 21, the generation of the leaking electric field E1 causes liquid crystal molecules LCm near the center of the pixel to orient toward the center of the pixel, and in contrast, causes liquid crystal molecules LCm around the storage capacitor lines CSL to orient toward the storage capacitor lines CSL under the influence of the leaking electric field E1. This results in the liquid crystal molecules LCm near the center of the pixel and those around the storage capacitor lines CSL to tilt in directions which differ by 135°. The orientation of the liquid crystal molecules LCm thus becomes irregular. Transmittance decreases where the orientation of the liquid crystal molecules LCm is irregular, thereby leading to poor display quality.

FIG. 22 is a photograph of a pixel in which the orientation has such irregularity. The pixel is a standard cell in a 40-inch TV display panel with full-specification HD resolution. As encircled by a broken line, the liquid crystal molecules on the pixel edge 101e, right under which a storage capacitor line CSL is located, exhibit irregular orientation, which in turn causes a dark line on the pixel edge 101e.

The present invention, conceived in view of these conventional problems, has an object to realize a liquid crystal display device which includes pixel electrodes including a plurality of stripe electrodes separated from each other by a distance and which is capable of providing a solution to irregular orientation of liquid crystal molecules in polymer sustained alignment.

Solution to Problem

In order to address the problems, a liquid crystal display device in accordance with the present invention is a liquid crystal display device of active matrix type, including: a liquid crystal layer; pixel electrodes; a common electrode; and storage capacitor lines, wherein the liquid crystal layer is located between the pixel electrodes and the common electrode, each of the pixel electrodes includes either a single regional electrode or two or more regional electrodes which are electrically connected to each other, the or each regional electrode being provided with: a first electrode which has a pattern dividing a first region where the regional electrode is formed into a plurality of second regions; and a plurality of stripe electrodes which are provided in each of the plurality of second regions so as to extend from the first electrode and so as to be separated from each other by a distance, and each of the storage capacitor lines is provided facing one of the pixel electrodes in a film thickness direction, so as not to extend facing an edge of the first region in the film thickness direction parallelly to the edge, the storage capacitor line being allocated to that pixel electrode to form a storage capacitor.

According to the invention, no storage capacitor line is provided to extend in such a manner that it faces, parallel to an edge of the area where the regional electrode is provided, the edge in the film thickness direction. For this reason, the storage capacitor line generates no leaking electric field which may disturb the orientation of liquid crystal molecules in the polymer sustained alignment process. Therefore, the liquid crystal molecules assume an intended normal orientation.

The invention hence advantageously realizes a liquid crystal display device which includes pixel electrodes each of which is provided with a plurality of stripe electrodes separated from each other by a distance, the liquid crystal display device successfully addressing irregular orientation of liquid crystal molecules in polymer sustained alignment.

Another liquid crystal display device in accordance with the present invention, in order to address the problems, is a liquid crystal display device of active matrix type, including: a liquid crystal layer; pixel electrodes; a common electrode; and storage capacitor lines, wherein the liquid crystal layer is located between the pixel electrodes and the common electrode, each of the pixel electrodes includes either a single regional electrode or two or more regional electrodes which are electrically connected to each other, the or each regional electrode being provided with: a first electrode which has a pattern dividing a first region where the regional electrode is formed into a plurality of second regions; and a plurality of stripe electrodes which are provided in each of the plurality of second regions so as to extend from the first electrode and so as to be separated from each other by a distance, and each of the storage capacitor lines is provided for one of the pixel electrodes to which that storage capacitor line is allocated to form a storage capacitor, the storage capacitor line being provided with: a first wiring section which extends facing an edge of the first region parallelly to the edge; and a second wiring section which extends from the first wiring section in a direction intersecting with the first wiring section in an area which is located facing the first region.

According to the invention, the provision of the first wiring section and the second wiring section causes the liquid crystal molecules on edges to tilt toward the first wiring section and in contrast, causes those in the peripheral region of the second wiring section to tilt toward the second wiring section. Therefore, the liquid crystal molecules readily tilt in the mid-direction. The liquid crystal molecules, as a whole, readily tilt in an intended direction.

The invention hence advantageously realizes a liquid crystal display device which includes pixel electrodes each of which is provided with a plurality of stripe electrodes separated from each other by a distance, the liquid crystal display device successfully addressing irregular orientation of liquid crystal molecules in polymer sustained alignment.

Advantageous Effects of Invention

A liquid crystal display device in accordance with the present invention, as described in the foregoing, is a liquid crystal display device of active matrix type, including: a liquid crystal layer; pixel electrodes; a common electrode; and storage capacitor lines, wherein the liquid crystal layer is located between the pixel electrodes and the common electrode, each of the pixel electrodes includes either a single regional electrode or two or more regional electrodes which are electrically connected to each other, the or each regional electrode being provided with: a first electrode which has a pattern dividing a first region where the regional electrode is formed into a plurality of second regions; and a plurality of stripe electrodes which are provided in each of the plurality of second regions so as to extend from the first electrode and so as to be separated from each other by a distance, and each of the storage capacitor lines is provided facing one of the pixel electrodes in a film thickness direction, so as not to extend facing an edge of the first region in the film thickness direction parallelly to the edge, the storage capacitor line being allocated to that pixel electrode to form a storage capacitor.

Another liquid crystal display device in accordance with the present invention, as described in the foregoing, is a liquid crystal display device of active matrix type, including: a liquid crystal layer; pixel electrodes; a common electrode; and storage capacitor lines, wherein the liquid crystal layer is located between the pixel electrodes and the common electrode, each of the pixel electrodes includes either a single regional electrode or two or more regional electrodes which are electrically connected to each other, the or each regional electrode being provided with: a first electrode which has a pattern dividing a first region where the regional electrode is formed into a plurality of second regions; and a plurality of stripe electrodes which are provided in each of the plurality of second regions so as to extend from the first electrode and so as to be separated from each other by a distance, and each of the storage capacitor lines is provided for one of the pixel electrodes to which that storage capacitor line is allocated to form a storage capacitor, the storage capacitor line being provided with: a first wiring section which extends facing an edge of the first region parallelly to the edge; and a second wiring section which extends from the first wiring section in a direction intersecting with the first wiring section in an area which is located facing the first region.

The invention hence advantageously realizes a liquid crystal display device which includes pixel electrodes each of which is provided with a plurality of stripe electrodes separated from each other by a distance, the liquid crystal display device successfully addressing irregular orientation of liquid crystal molecules in polymer sustained alignment.

DESCRIPTION OF EMBODIMENTS

The following will describe embodiments of the present invention in reference to FIGS. 1 to 17.

Figure 17:
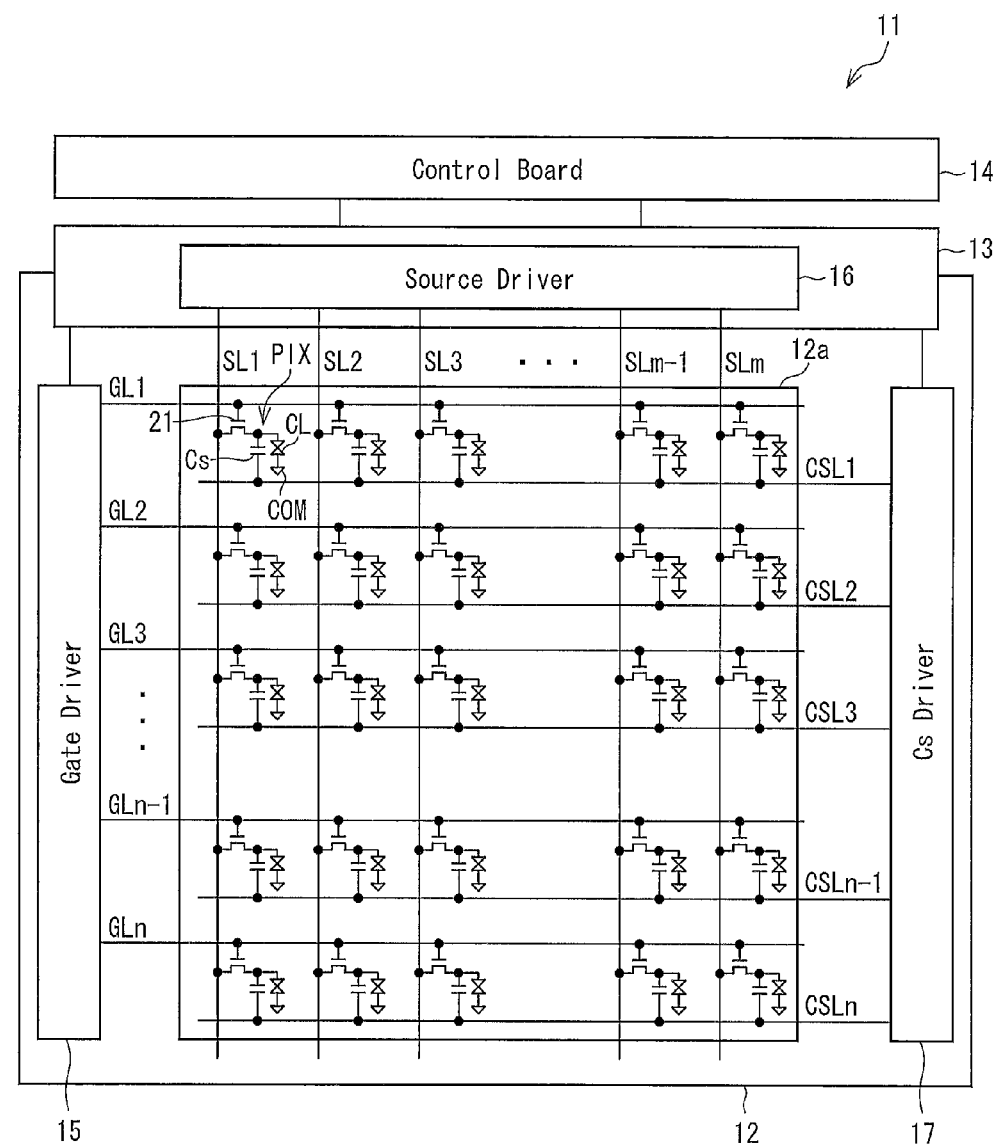
FIG. 17, representing an embodiment of the present invention, is a block diagram of a display device.
Figure 18:
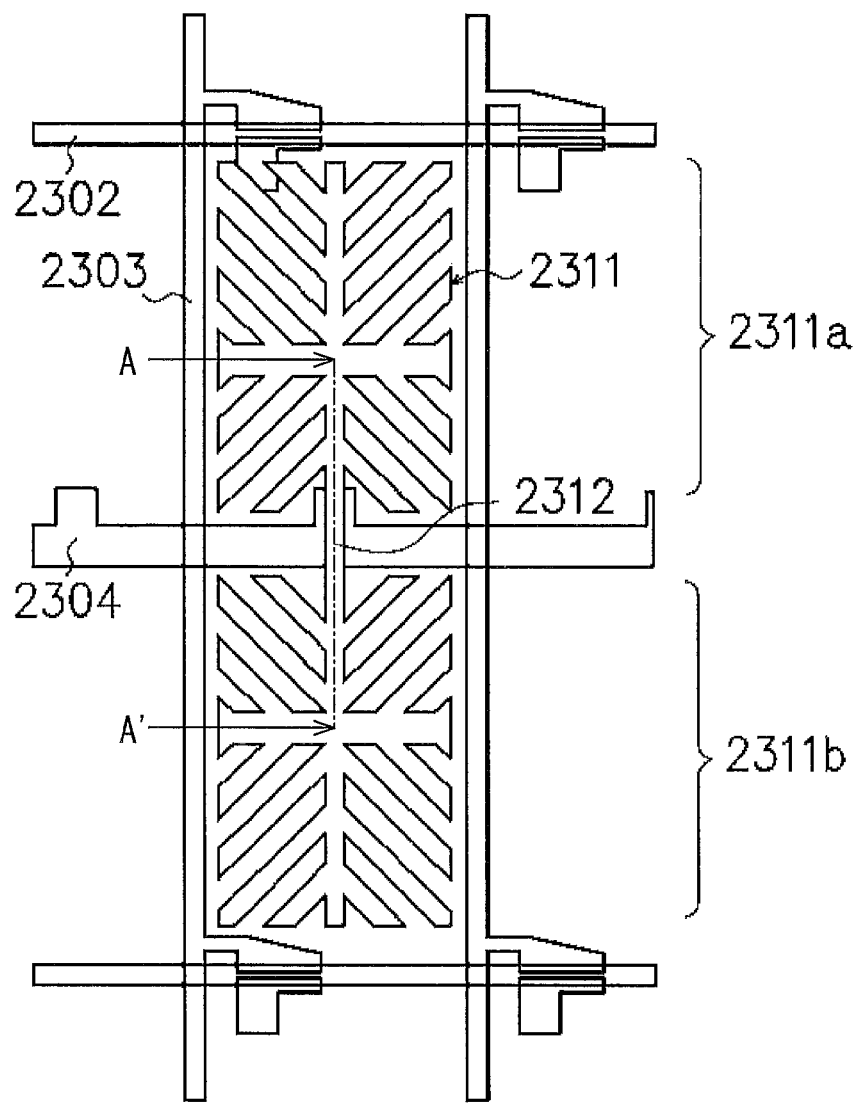
FIG. 18, representing conventional art, is a plan view of a pixel.
Figure 19:
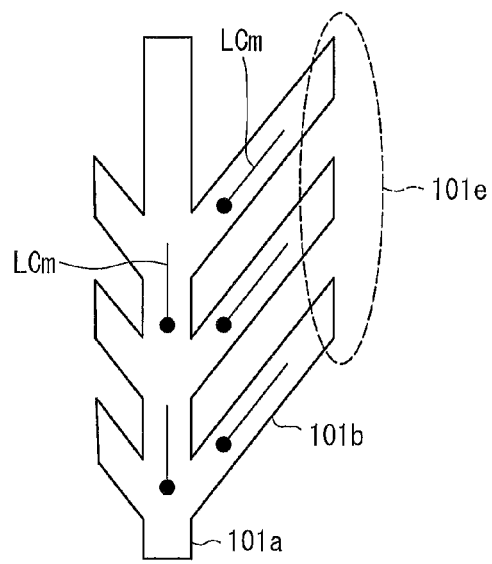
FIG. 19, representing conventional art, is a diagram illustrating behavior of liquid crystal molecules on a pixel electrode including stripe electrodes.

FIG. 17 represents an arrangement of a liquid crystal display device 11 which is a display device in accordance with the present embodiment.

The liquid crystal display device 17 includes a display panel 12, a flexible printed circuit board 13, and a control board 14.

The display panel 12 is an active matrix display panel in which there are provided, on a glass substrate, a display area 12a, gate bus lines (scan signal lines) GL, source bus lines (data signal lines) SL, and storage capacitor bus lines (storage capacitor lines) CSL, using amorphous silicon-based TFTs. Alternatively, the display panel 12 may be fabricated using, for example, polycrystalline silicon-, CG silicon-, microcrystal silicon-, or IGZO (In—Ga—Zn—O)-based TFTs.

The display panel 12 further includes a gate driver (scan signal line driver circuit) 15 and a Cs driver (storage capacitor line driver circuit) 17. The gate driver 15 and the Cs driver 17 are not necessarily provided on the display panel 12. Alternatively, the drivers 15 and 17 may be located respectively on dedicated boards, formed monolithically on the display panel 12, mounted on the flexible printed circuit board 13, or provided in any other proper form.

The display area 12a is an area where a matrix of pixels PIX is provided. Conceptually, the pixel PIX encompasses a sub-pixel. Each pixel PIX is provided with a TFT (pixel selecting element) 21, a liquid crystal capacitor CL, and a storage capacitor Cs. The TFT 21 has a gate terminal connected to one of the gate bus lines GL and a source terminal connected to one of the source bus lines SL. An end of the liquid crystal capacitor CL and an end of the storage capacitor Cs are composed of a pixel electrode which is connected to the drain of the TFT 21. The other end of the liquid crystal capacitor CL is composed of a common electrode COM. The other end of the storage capacitor Cs is composed of one of the storage capacitor bus lines CSL. The liquid crystal layer contains liquid crystal molecules which have a negative dielectric anisotropy and which are vertically aligned to realize MVA driving. The liquid crystal layer is subjected to polymer sustained alignment during manufacture of the liquid crystal display device 11. A pretilt angle is imparted to the vertically aligned liquid crystal molecules by use of a polymer.

The gate bus lines GL include gate bus lines GL1, GL2, GL3, . . . , and GLn. A gate bus line, GLi, in the i-th row (i is such an integer that $1 \leq i \leq n$) is connected to an i-th row output of the gate driver 15. The source bus lines SL include source bus lines SL1, SL2, SL3, . . . , and SLm. A source bus line, SLj, in the j-th column (j is such an integer that $1 \leq j \leq m$) is connected to a j-th column output of a source driver 16 (which will be described later in detail). The storage capacitor bus lines CSL include storage capacitor bus lines CSL1, CSL2, CSL3, . . . , and CSLn. A storage capacitor bus line, CSLi, in the i-th row (i is such an integer that $1 \leq i \leq n$) may be connected to an output of the Cs driver 17 which is provided either commonly for all rows or solely for the i-th row, or may be otherwise arranged in a suitable manner depending on the form of the storage capacitor voltage applied to the end of the storage capacitor Cs composed of the storage capacitor bus line CSLi.

The gate driver 15 supplies gate pulses (scan pulses) to the gate bus lines GL sequentially. The Cs driver 17 supplies a storage capacitor voltage to the storage capacitor bus lines CSL.

The flexible printed circuit board 13 includes the source driver 16 which supplies a data signal to the source bus lines SL. The source driver 16 may be provided on the display panel 12 monolithically to the display area 12a. The control board 14 is connected to the flexible printed circuit board 13 to supply necessary signals and power to the gate driver 15 and the source driver 16. The signals and power to be supplied from the control board 14 to the gate driver 15 are delivered via the flexible printed circuit board 13 and from the display panel 12 to the gate driver 15.

The following will describe examples of the pixels PIX in accordance with the present embodiment.

Example 1

Figure 1:
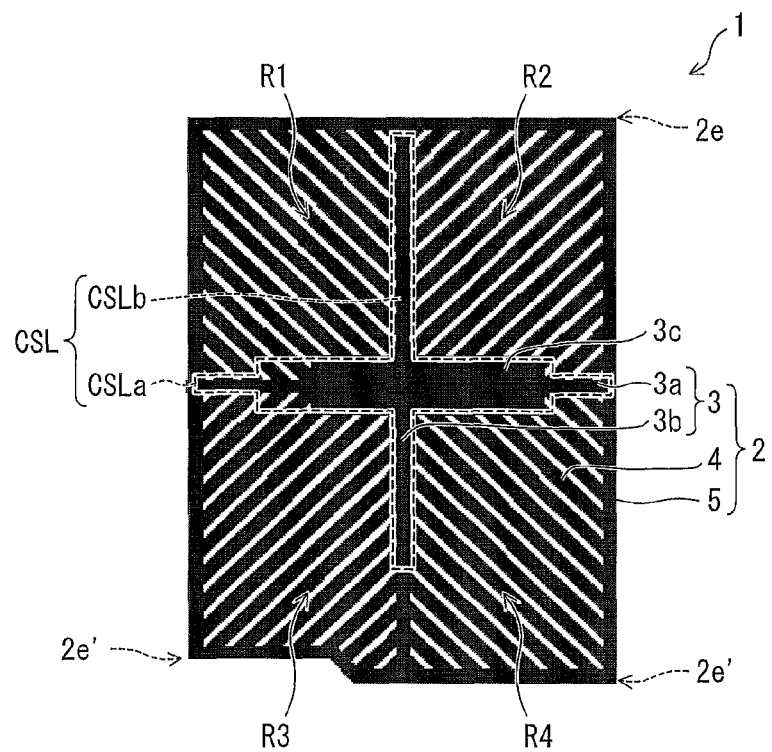
FIG. 1, representing an embodiment of the present invention, is a plan view of an arrangement of a pixel electrode and a storage capacitor line in Example 1.

FIG. 1 is a plan view of an arrangement of a pixel electrode 1 and a storage capacitor bus line CSL in a pixel PIX in accordance with Example 1.

The pixel electrode 1 is provided with a regional electrode 2. The pixel electrode 1 consists of a regional electrode 2 in Example 1; the pixel electrode 1 may include other members. In addition, the pixel electrode 1 is composed of a transparent electrode (ITO) in Example 1; alternatively, the pixel electrode 1 may be made of any other material.

The regional electrode 2 includes a cross-shaped electrode (first electrode) 3, stripe electrodes 4, and a peripheral electrode (second electrode) 5.

The cross-shaped electrode 3 has a cross-shaped wiring pattern which divides a region (first region) where the regional electrode 2 is formed into four regions (second regions) R1, R2, R3, and R4. The cross-shaped electrode 3 is provided with a stem electrode 3a which extends in the row direction and a stem electrode 3b which extends in the column direction. The stem electrode 3a includes, at the central part of the regional electrode 2, a storage capacitor electrode pad 3c where the stem width is expanded, especially, to increase the area located facing the storage capacitor bus line CSL. A large-area segment like the storage capacitor electrode pad 3c may have a contact with the drain of a TFT 21 (selecting element for the pixel PIX) through a contact hole. Each second region is provided as a domain for MVA driving. The first electrode may therefore divide the first region into a suitable number of second regions (generally two or more second regions) in accordance with the domain arrangement. The first electrode is hence not necessarily shaped like a cross and may be formed in a linear pattern which divides the first region into two second regions, a star-shaped pattern which divides the first region into three second regions, or any other dividing pattern.

The stripe electrodes 4 are provided, separated from each other by a distance, to extend from the cross-shaped electrode 3 toward pixel edges. The stripe electrodes 4 are positioned, in this example, at 45° (to the upward direction) in two of the regions R1 to R4 and at 135° in the two other regions in such a manner that the stripe electrodes 4 in each second region have a different inclination angle from that of the stripe electrodes 4 in a second region adjacent to it in either the column direction or the row direction. Those segments which provide the distance separating the stripe electrodes 4 are also included in the first region. The inclination angles are arbitrary and may be equal to zero in one or more domains.

Each storage capacitor bus line CSL is allocated to a pixel electrode 1, as indicated by broken lines in FIG. 1, to form a storage capacitor Cs between itself and the pixel electrode 1. The storage capacitor bus line CSL is provided with a stem line section CSLa and a branch line section CSLb in an area of the pixel electrode 1 to which the storage capacitor bus line CSL is allocated. The stem line section CSLa extends in the row direction, facing the stem electrode 3a of the cross-shaped electrode 3. The branch line section CSLb extends in the column direction, facing the stem electrode 3b of the cross-shaped electrode 3. The stem line section CSLa and the branch line section CSLb are connected to each other at a position which faces, in the film thickness direction, the center of the cross-shaped electrode 3. The storage capacitor Cs is formed by positioning the storage capacitor bus line CSL and the cross-shaped electrode 3 so that they face each other. The storage capacitor bus line CSL includes, at the central part of the regional electrode 2, a wide-width section where the line width is expanded to contain the area located facing the storage capacitor electrode pad 3c.

Figure 20:
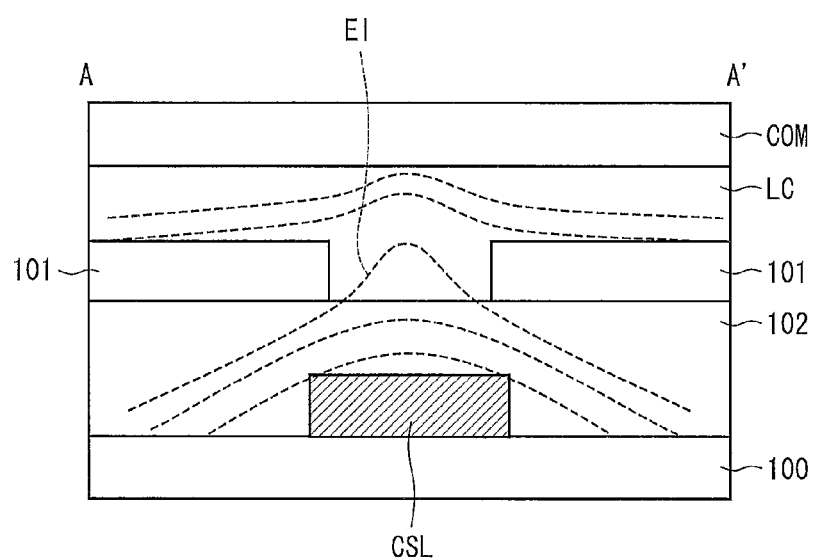
FIG. 20 is a cross-sectional view of FIG. 18 taken along line A-A'.
Figure 21:
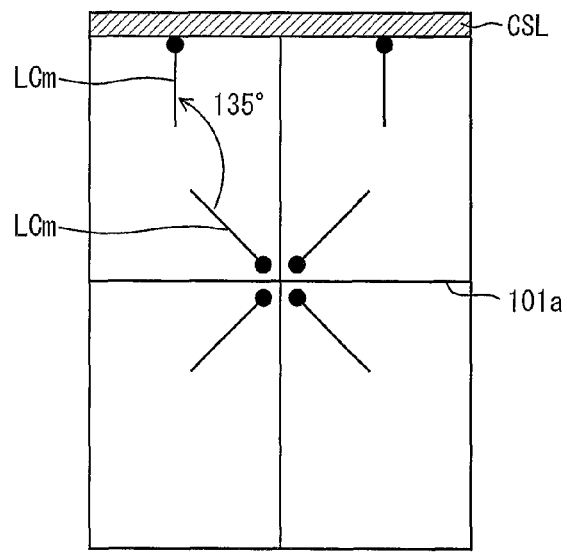
FIG. 21, representing conventional art, is a diagram illustrating problems in behavior of liquid crystal molecules on a pixel electrode including stripe electrodes.

As mentioned above, the storage capacitor bus line CSL is provided, in the pixel electrode 1 to which the storage capacitor bus line CSL is allocated, so as to face, in the film thickness direction, those parts of the area where the regional electrode 2 is provided, except for edges 2e and 2e' extending parallel to the storage capacitor bus line CSL. In other words, the storage capacitor bus line CSL is provided so as to overlap projections of edges in the film thickness direction. In contrast, in a conventional arrangement, the storage capacitor line CSL is provided at a position which faces, in the film thickness direction, the edge of a pixel electrode 101 parallel to which the storage capacitor line CSL extends, as illustrated in FIG. 20.

Conventionally, the edge 2e is located so as to face the storage capacitor bus line CSL, and the edge 2e' is located across from the edge 2e. In the present example, the edge 2e' is the one on which the TFTs 21 and the gate bus lines GL in FIG. 17 are located.

The peripheral electrode 5 forms a periphery for the entire area where the regional electrode 2 is provided. The cross-shaped electrode 3 and the stripe electrodes 4 of each regional electrode 2 are connected to the peripheral electrode 5 in the periphery. The peripheral electrode 5 may not be provided.

Figure 2:
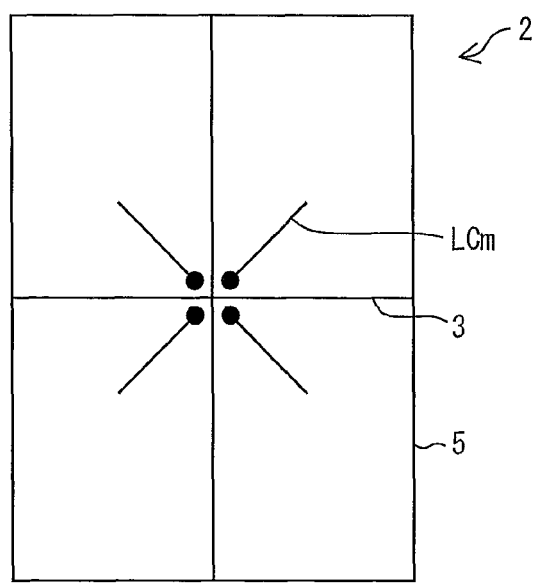
FIG. 2 is a diagram illustrating behavior of liquid crystal molecules in the arrangement in FIG. 1.

According to the arrangement of the pixel electrode 1 and the storage capacitor bus line CSL discussed above, none of the storage capacitor line CSL is provided to extend in such a manner that it faces, parallel to an edge of the area where the regional electrode 2 is provided, the edge in the film thickness direction. For this reason, the storage capacitor bus line CSL generates no leaking electric field which may disturb the orientation of the liquid crystal molecules LCm in the polymer sustained alignment process. Therefore, the liquid crystal molecules LCm assume an intended normal orientation: for example, they tilt uniformly toward the center of the regional electrode 2 as illustrated in FIG. 2.

Figure 3:
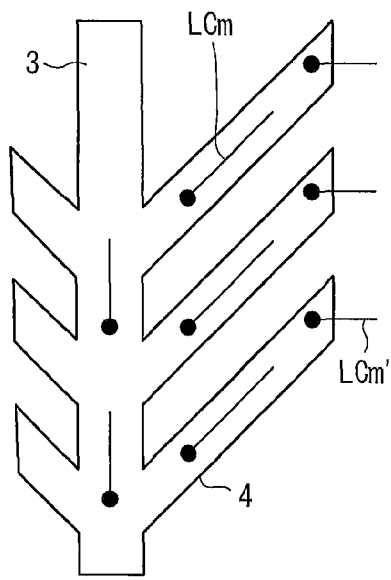
FIG. 3 is a diagram illustrating behavior of liquid crystal molecules in the arrangement in FIG. 1, with no second electrode being provided.
Figure 4:
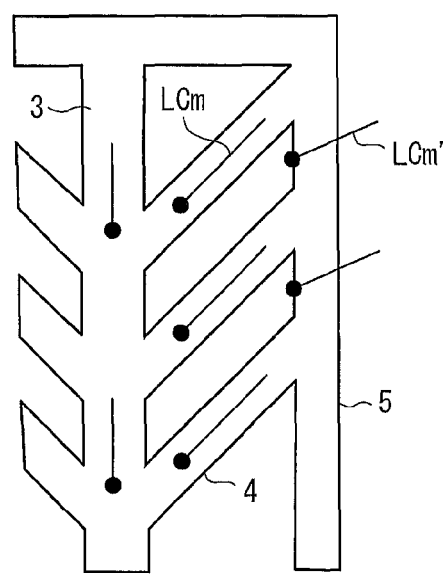
FIG. 4 is a diagram illustrating behavior of liquid crystal molecules in the arrangement in FIG. 1, with a second electrode being provided.

The provision of the peripheral electrode 5 to the pixel electrode 1 enhances uniform orientation of the liquid crystal molecules LCm. The liquid crystal molecules LCm' near an edge of the regional electrode 2 can, in the absence of the peripheral electrode 5, tilt perpendicular to the edge of the regional electrode 2 as illustrated in FIG. 3. When this is the case, the liquid crystal molecules LCm' near the edge of the regional electrode 2 tilt differently from the liquid crystal molecules LCm at the central part of the pixel (i.e., they are displaced from the inclination angle of 45° or 135°). Consequently, transmission loss grows, and transmittance decreases. When the peripheral electrode 5 is provided as illustrated in FIG. 4, the edges of the regional electrode 2 give less impact on electric field because the edges of the cross-shaped electrode 3 and the edges of the stripe electrodes 4 are interconnected. Accordingly, the liquid crystal molecules LCm' near the edges of the regional electrode 2 will more likely tilt in the same inclination direction of 45° or 135° as will the liquid crystal molecules LCm at the central part of the pixel, than in the case of FIG. 3. Therefore, transmission loss decreases, and transmittance grows.

Figure 5:
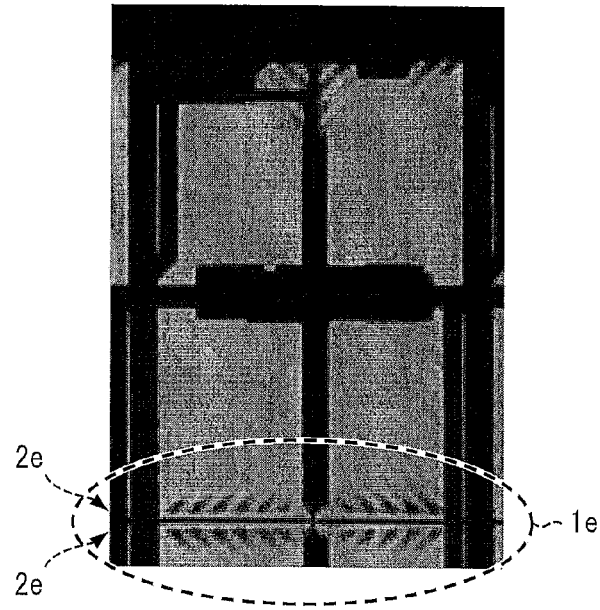
FIG. 5 is a drawing showing reduced irregular orientation of liquid crystal molecules in the arrangement in FIG. 1, with no second electrode being provided.
Figure 22:
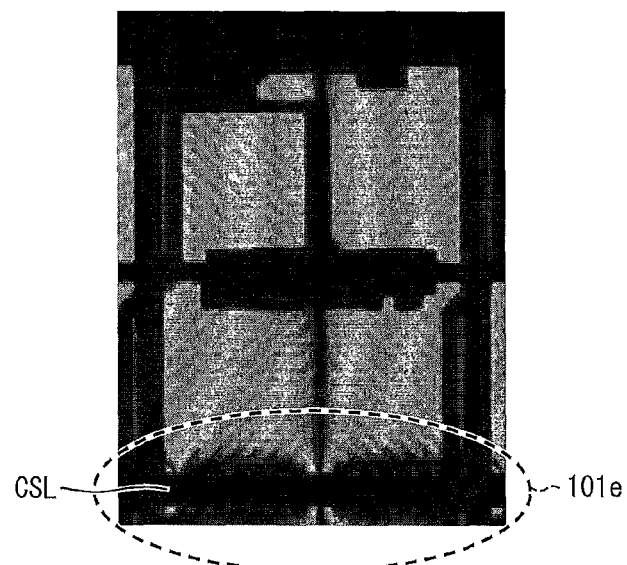
FIG. 22 is a drawing showing irregular orientation caused by the behavior of liquid crystal molecules in FIG. 21.

FIG. 5 shows, in a photograph, how the orientation of liquid crystal molecules on a pixel edge 1e improves due to the non-provision of the storage capacitor bus line CSL on the edge 2e. This pixel incorporates the pixel arrangement in accordance with the present example and is fabricated under similar manufacturing conditions to the case of FIG. 22. No peripheral electrode 5 is formed. FIG. 5 shows a smaller dark area (an indicator of irregular orientation) on the pixel edge 1e than FIG. 22 does on the pixel edge 101e.

Figure 6:
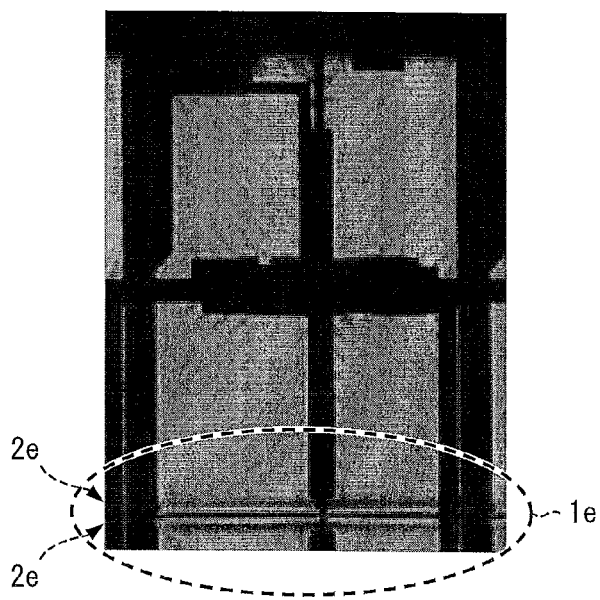
FIG. 6 is a drawing showing reduced irregular orientation of liquid crystal molecules in the arrangement in FIG. 1, with a second electrode being provided.

FIG. 6 shows, in a photograph, how the orientation of liquid crystal molecules improves due to the addition of the peripheral electrode 5 to the pixel in FIG. 5. The irregular orientation on the pixel edge 1e is further reduced. FIG. 6 shows even fewer dark lines (an indicator of irregular orientation) than FIG. 5.

Example 2

Example 2 describes arrangements for variations of example 1.

Figure 7:
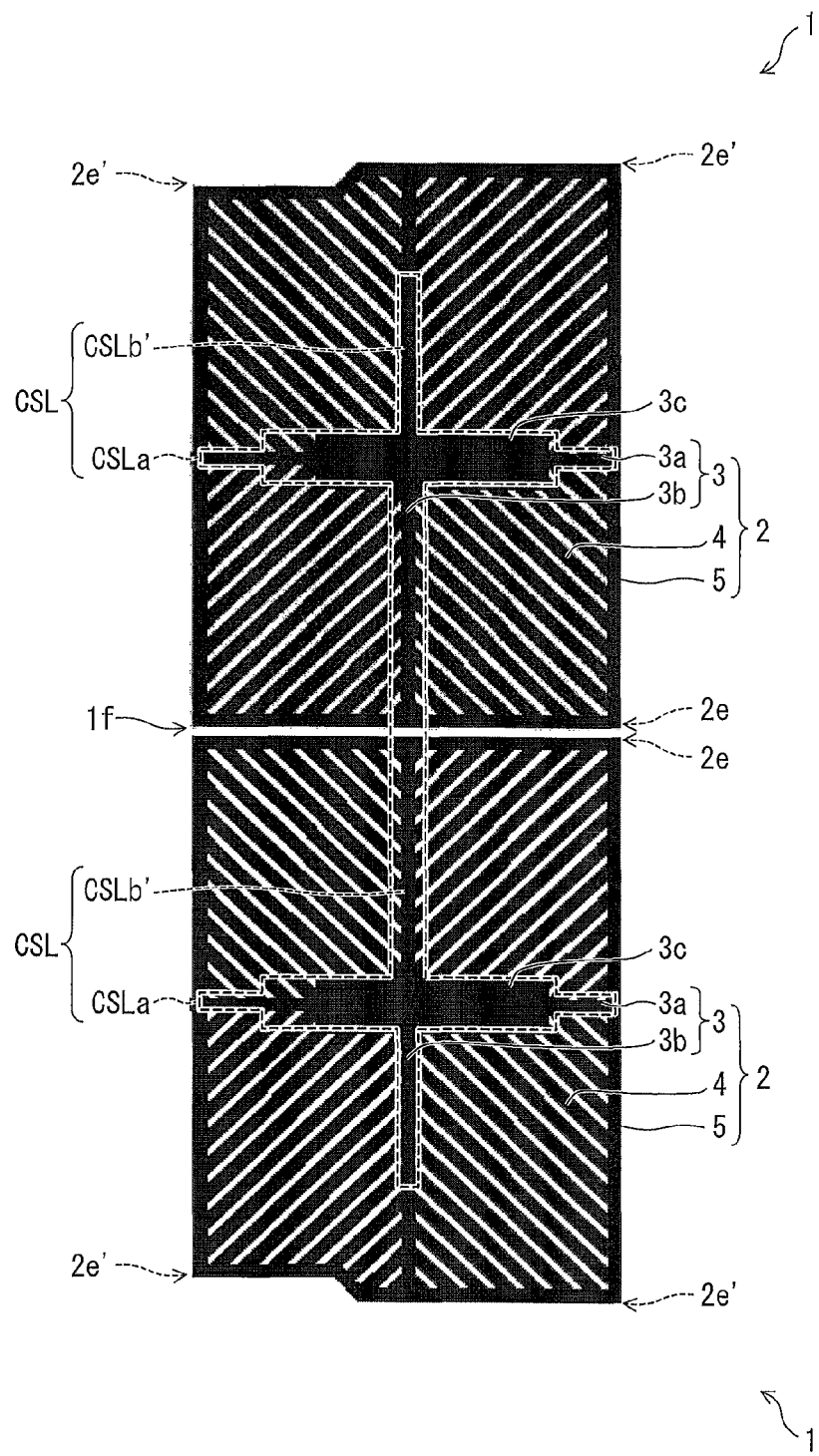
FIG. 7, representing an embodiment of the present invention, is a plan view of an arrangement of pixel electrodes and storage capacitor lines in Example 2.

FIG. 7 is a plan view of an arrangement of pixel electrodes 1 and storage capacitor bus lines CSL in pixels PIX in accordance with a first variation example.

Each pixel electrode 1 is arranged similarly to the pixel electrode 1 in FIG. 1, and description of its detailed arrangement is omitted.

Each storage capacitor bus line CSL is identical to the storage capacitor bus line CSL in FIG. 1 except that the branch line section CSLb is replaced by a branch line section (connecting wire) CSLb'. The branch line sections CSLb' of the two storage capacitor bus lines CSL allocated to the pixel electrodes 1 of two pixels PIX which are adjacent to each other in the column direction are connected to each other in a pixel boundary 1f which makes up a boundary between the pixel electrodes 1. Each branch line section CSLb' is provided so as to face a stem electrode 3b in the film thickness direction.

Figure 8:
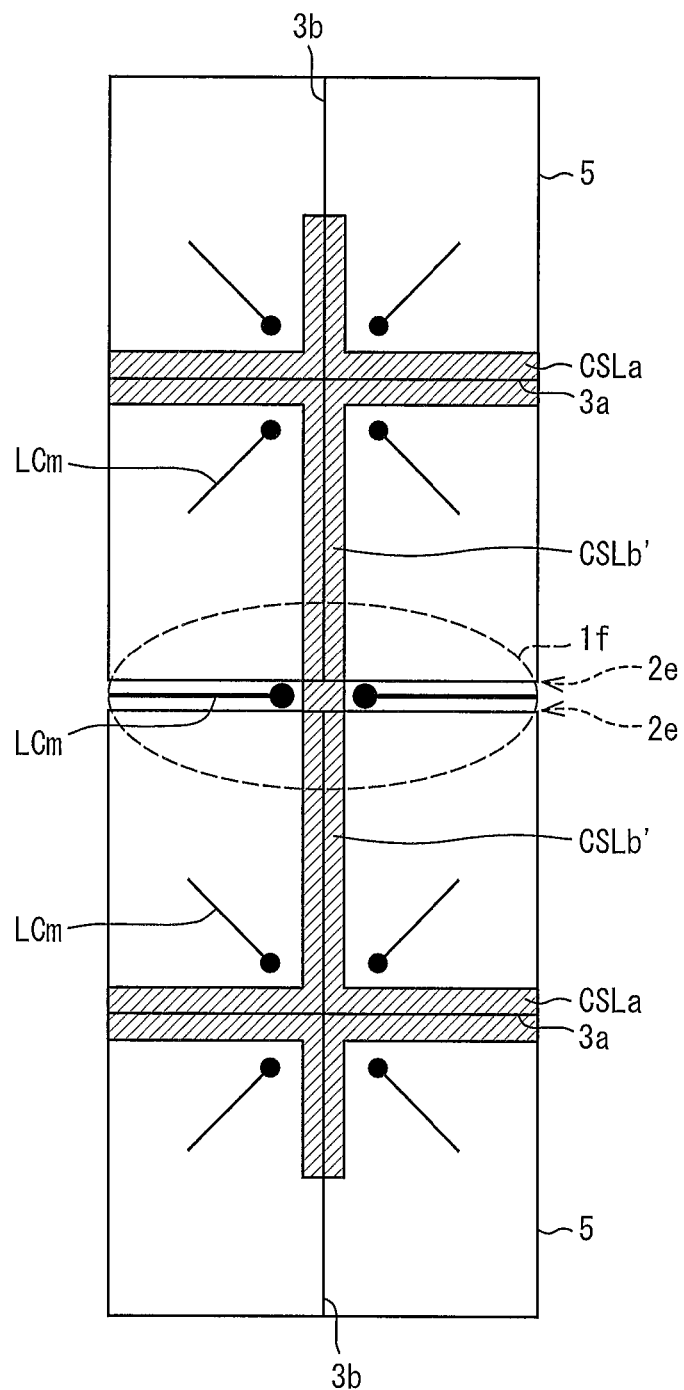
FIG. 8 is a diagram illustrating behavior of liquid crystal molecules in the arrangement in FIG. 7.
Figure 10:
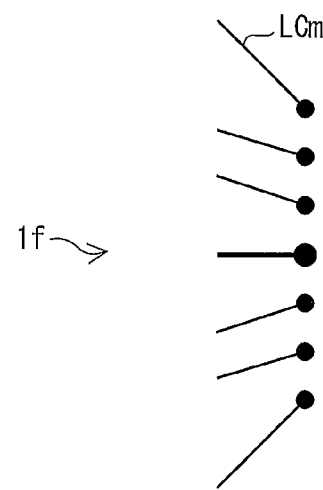
FIG. 10 is a diagram illustrating behavior of the liquid crystal molecules in FIG. 8 in detail.

The arrangement causes the liquid crystal molecules LCm in the region 1f between the pixel electrodes 1 of the two pixels PIX to tilt toward the branch line sections CSLb' in a stable manner as illustrated in FIG. 8. In this situation, if the liquid crystal molecules LCm in one of the two domains on the sides of the pixel boundary 1f tilt in a 45° direction, and those in the other domain tilt in a 135° direction, the liquid crystal molecules LCm in the region 1f readily tilt in the mid-direction of these angles (i.e., 90° direction) in a stable manner for the following reason. The provision of the branch line section CSLb in the pixel boundary 1f changes the orientation into which both the liquid crystal molecules LCm in the pixel boundary and those in its surroundings tilt to a predetermined orientation as illustrated in FIG. 10.

Figure 9:
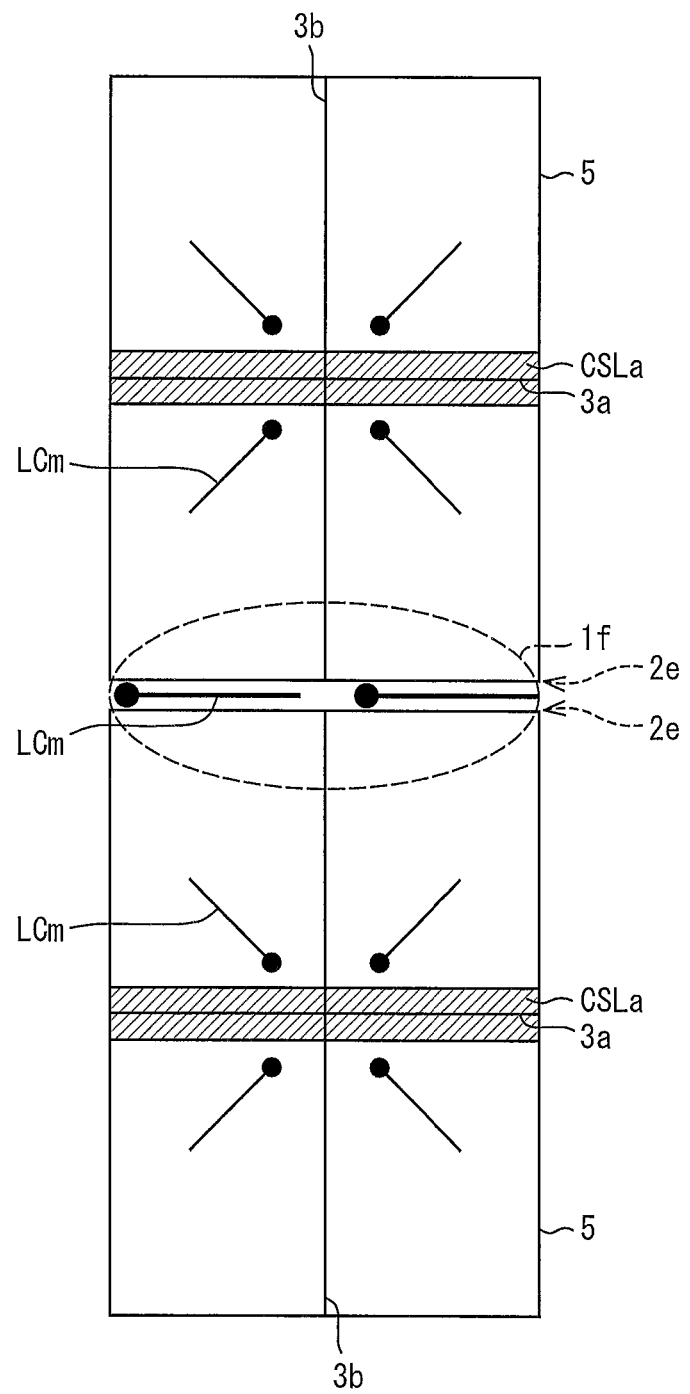
FIG. 9 is a diagram illustrating behavior of liquid crystal molecules in the arrangement in FIG. 7, with no connecting wire being provided.
Figure 11:
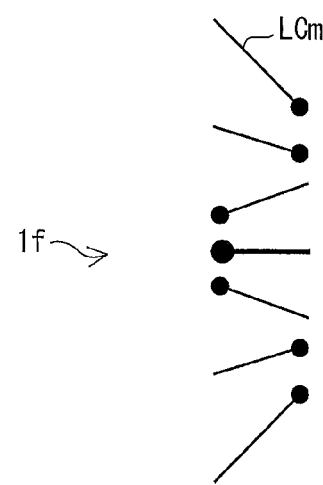
FIG. 11 is a diagram illustrating behavior of the liquid crystal molecules in FIG. 9 in detail.

In contrast, as illustrated in FIG. 9, in the absence of the branch line sections CSLb' and an arrangement connecting the branch line sections CSLb', the orientation into which the liquid crystal molecules LCm in the region 1f tilt is indefinite, and the liquid crystal molecules LCm may possibly orient in an opposite direction (270° direction). Therefore, in this arrangement, the orientation of the liquid crystal molecules LCm in the region 1f tends to be indefinite, and the liquid crystal molecules LCm are unlikely to orient properly as illustrated in FIG. 11.

Next, a second variation example is described.

The second variation example differs from the arrangement in FIG. 2 in that the stem electrodes 3b of, for example, the two regional electrodes 1 are connected together, and at least the stem line section CSLa of either one of the storage capacitor lines CSL is missing, so that each pixel electrode includes two regional electrodes 2. There may or may not be provided a branch line section CSLb'. If a branch line section CSLb' is allocated to, and provided in, one of the regional electrodes 2 which does not have a stem line section CSLa, the branch line section CSLb' may be connected to the storage capacitor bus line CSL in the regional electrode 2 to which the branch line section CSLb' is allocated.

According to this arrangement, similarly to Example 1, none of the storage capacitor line CSL is provided to extend in such a manner that it faces, parallel to an edge of the area where the regional electrode 2 is provided, the edge in the film thickness direction. For this reason, the storage capacitor bus line CSL generates no leaking electric field which may disturb the orientation of the liquid crystal molecules LCm in the polymer sustained alignment process.

Each pixel electrode includes two regional electrodes 2 in this example. Generally, a pixel electrode may include two or more regional electrodes 2 which are electrically connected to each other.

Alternatively, any number of regional electrodes 2 may be electrically connected to an electrode arranged differently from the regional electrode 2, so as to form a single pixel electrode.

Example 3

Figure 12:
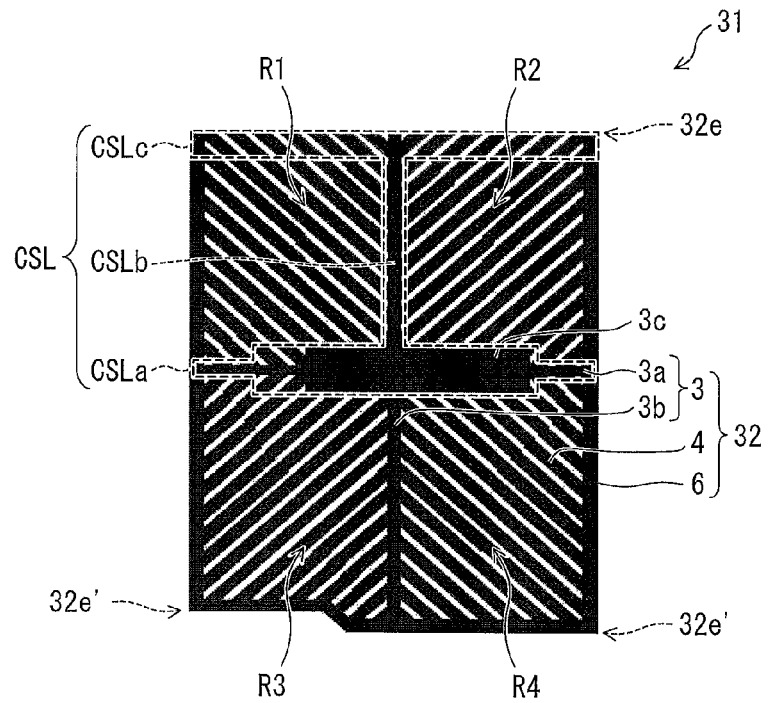
FIG. 12, representing an embodiment of the present invention, is a plan view of an arrangement of a pixel electrode and a storage capacitor line in Example 3.

FIG. 12 is a plan view of an arrangement of a pixel electrode 31 and a storage capacitor bus line CSL in a pixel PIX in accordance with Example 3.

The pixel electrode 31 is provided with a regional electrode 32. The pixel electrode 31 consists of a regional electrode 32 in Example 3; the pixel electrode 31 may include other members. In addition, the pixel electrode 31 is composed of a transparent electrode (ITO) in Example 3; alternatively, the pixel electrode 31 may be made of any other material.

The regional electrode 32 includes a cross-shaped electrode (first electrode) 3, stripe electrodes 4, and a peripheral electrode (second electrode) 6.

The cross-shaped electrode 3 has a cross-shaped pattern which divides a region (first region) where the regional electrode 32 is formed into four regions (second regions) R1, R2, R3, and R4. The cross-shaped electrode 3 is provided with a stem electrode 3a which extends in the row direction and a stem electrode 3b which extends in the column direction. The stem electrode 3a includes, at the central part of the regional electrode 32, a storage capacitor electrode pad 3c where the stem width is expanded, especially, to increase the area located facing the storage capacitor bus line CSL. A large-area segment like the storage capacitor electrode pad 3c may have a contact with the drain of a TFT 21 (selecting element for the pixel PIX) through a contact hole. Each second region is provided as a domain for MVA driving. The first electrode may therefore divide the first region into a suitable number of second regions (generally two or more second regions) in accordance with the domain arrangement. The first electrode is hence not necessarily shaped like a cross and may be formed in a linear pattern which divides the first region into two second regions, a star-shaped pattern which divides the first region into three second regions, or any other dividing pattern.

The stripe electrodes 4 are provided, separated from each other by a distance, to extend from the cross-shaped electrode 3 toward pixel edges. The stripe electrodes 4 are positioned, in this example, at 45° (to the upward direction) in two of the regions R1 to R4 and at 135° in the two other regions in such a manner that the stripe electrodes 4 in each second region have a different inclination angle from that of the stripe electrodes 4 in a second region adjacent to it in either the column direction or the row direction. Those segments which provide the distance separating the stripe electrodes 4 are also included in the first region. The inclination angles are arbitrary and may be equal to zero in one or more domains.

Each storage capacitor bus line CSL is allocated to a pixel electrode 31, as indicated by broken lines in FIG. 12, to form a storage capacitor Cs between itself and the pixel electrode 31. The storage capacitor bus line CSL is provided with a stem line section CSLa, a branch line section (second wiring section) CSLb, and a branch line section (first wiring section) CSLc in an area of the pixel electrode 31 to which the storage capacitor bus line CSL is allocated. The stem line section CSLa extends in the row direction, facing the stem electrode 3a of the cross-shaped electrode 3. The branch line section CSLb extends in the column direction from the stem line section CSLa toward an edge 32e, facing the stem electrode 3b of the cross-shaped electrode 3. Conventionally, the edge 32e extends in a direction in which the storage capacitor bus line CSL extends and is located facing the storage capacitor bus line CSL. In the present example, an edge 32e', located across from the edge 32e, is an edge on which the TFTs 21 and the gate bus lines GL in FIG. 17 are provided. The branch line section CSLc is provided to extend parallel to the edge 32e, facing the edge 32e in the film thickness direction. The branch line section CSLb generally only needs to extend in a direction intersecting with the branch line section CSLc in an area which is located facing an area where the regional electrode 2 is provided.

The stem line section CSLa includes, at the central part of the regional electrode 2, a wide-width section where the line width is expanded to contain the area located facing the storage capacitor electrode pad 3c.

The peripheral electrode 6 has an angular C shape, making up the periphery of the area where the regional electrode 2 is provided, except for the edge 32e located facing the branch line section CSLc. The cross-shaped electrode 3 and the stripe electrodes 4 of each regional electrode 2 are connected to the peripheral electrode 6 in the periphery. The peripheral electrode 6 may not be provided.

Figure 13:
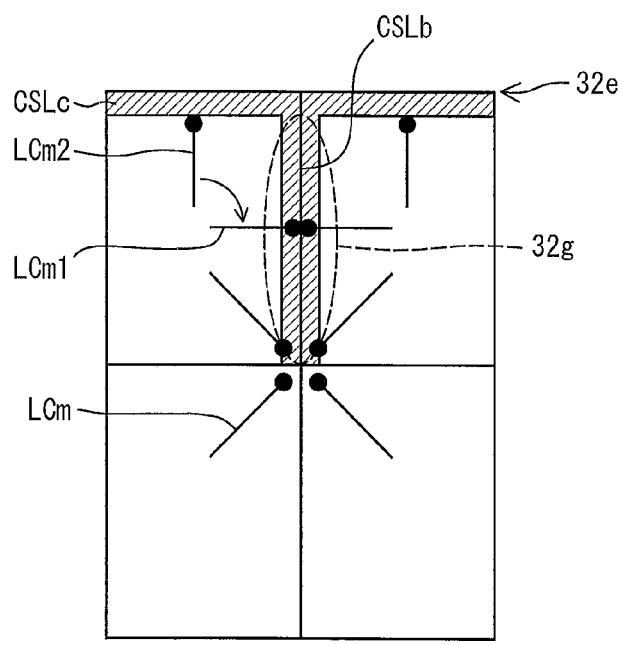
FIG. 13 is a diagram illustrating behavior of liquid crystal molecules in the arrangement in FIG. 12.

According to the arrangement of the pixel electrode 31 and the storage capacitor bus line CSL discussed above, the storage capacitor bus line CSL is provided with a branch line section CSLc which extends so as to face the edge 32e and a branch line section CSLb which extends from the branch line section CSLc in a direction intersecting with the branch line section CSLc. Therefore, as illustrated in FIG. 13, the liquid crystal molecules LCm2 on the edge 32e will tilt toward the branch line section CSLc, whereas the liquid crystal molecules LCm1 in a region 32g on the periphery of the branch line section CSLb will tilt toward the branch line section CSLb. As a result, the liquid crystal molecules LCm1 and LCm2 readily tilt in the mid-direction of these directions. The liquid crystal molecules LCm, including the liquid crystal molecules LCm1 and LCm2, readily tilt in an intended direction.

Figure 14:
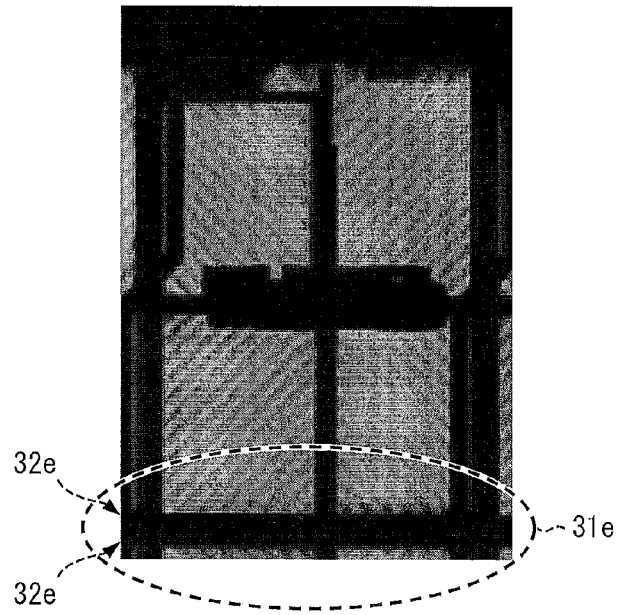
FIG. 14 is a drawing showing reduced irregular orientation of liquid crystal molecules in the arrangement of FIG. 13, with no second electrode being provided.

FIG. 14 shows, in a photograph, how the orientation of liquid crystal molecules on a pixel edge 31e improves. This pixel incorporates the pixel arrangement in accordance with the present example and is fabricated under similar manufacturing conditions to the case of FIG. 22. No peripheral electrode 6 is formed. FIG. 14 shows fewer dark lines (an indicator of irregular orientation) on the pixel edge 31e than FIG. 22 does on the pixel edge 101e.

Figure 15:
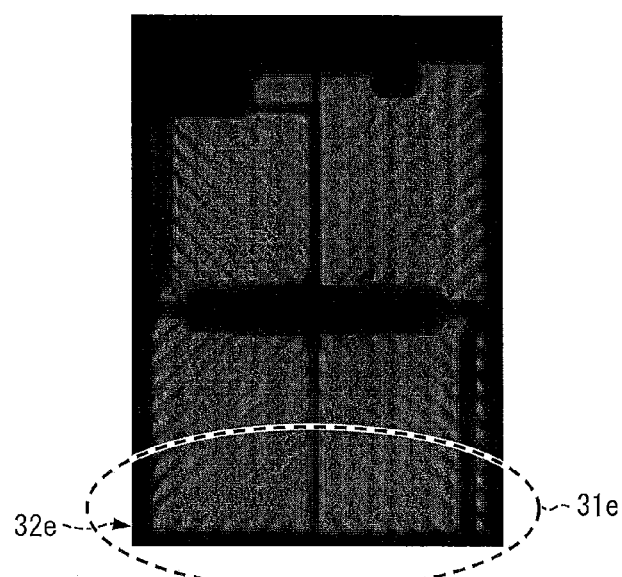
FIG. 15 is a drawing showing reduced irregular orientation of liquid crystal molecules in the arrangement of FIG. 13, with a second electrode being provided.
Figure 16:
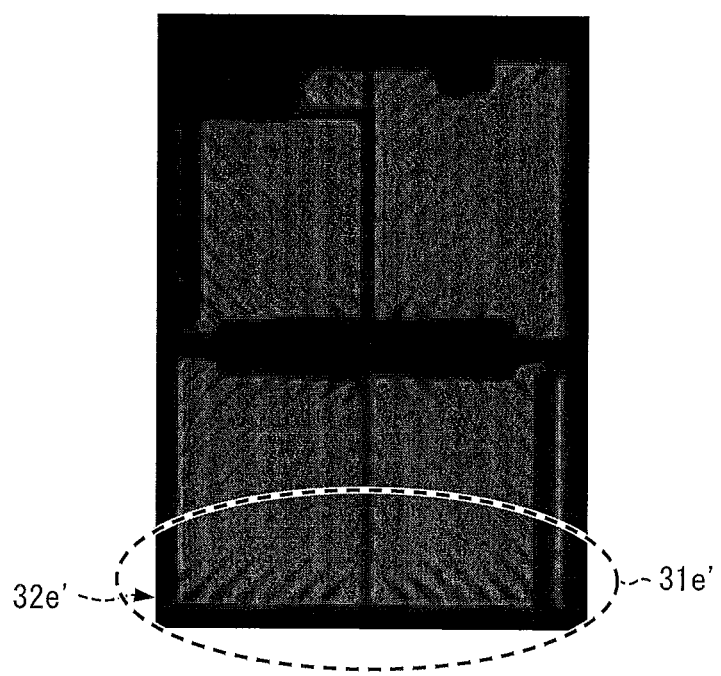
FIG. 16 is a drawing showing irregular orientation of liquid crystal molecules in an arrangement which is a comparative example for FIG. 15.

FIG. 15 shows, in a photograph, how the orientation of liquid crystal molecules improves due to the addition of the peripheral electrode 6 to the pixel in FIG. 14. The edges of the regional electrode 32 give less impact on electric field because the edges of the cross-shaped electrode 3 and the edges of the stripe electrodes 4 are interconnected. Accordingly, the liquid crystal molecules near the edges of the regional electrode 32 readily tilt in an intended inclination direction. Therefore, transmission loss decreases, and transmittance grows. In addition, no peripheral electrode is provided on the edge 32e because a peripheral electrode on the edge 32e will likely cause irregular orientation under the influence of the branch line section CSLc. Therefore, the irregular orientation on the pixel edge 31e is further reduced. FIG. 15 shows even fewer dark lines (an indicator of irregular orientation) than FIG. 14. FIG. 16 shows, for comparison, orientation on a pixel edge 31e' which is provided with an edge 32e' obtained by forming a peripheral electrode on the edge 32e so as to enclose the entire periphery of the regional electrode 2 with the electrode. The provision of the peripheral electrode on the edge 32e' causes greater irregular orientation than in the case of FIG. 15. Consequently, transmission loss grows, and transmittance decreases.

Various embodiments have been described so far.

As described in the foregoing, a liquid crystal display device in accordance with the present invention is a liquid crystal display device of active matrix type, including: a liquid crystal layer; pixel electrodes; a common electrode; and storage capacitor lines, wherein the liquid crystal layer is located between the pixel electrodes and the common electrode, each of the pixel electrodes includes either a single regional electrode or two or more regional electrodes which are electrically connected to each other, the or each regional electrode being provided with: a first electrode which has a pattern dividing a first region where the regional electrode is formed into a plurality of second regions; and a plurality of stripe electrodes which are provided in each of the plurality of second regions so as to extend from the first electrode and so as to be separated from each other by a distance, and each of the storage capacitor lines is provided facing one of the pixel electrodes in a film thickness direction, so as not to extend facing an edge of the first region in the film thickness direction parallelly to the edge, the storage capacitor line being allocated to that pixel electrode to form a storage capacitor.

According to the invention, no storage capacitor line is provided to extend in such a manner that it faces, parallel to an edge of the area where the regional electrode is provided, the edge in the film thickness direction. For this reason, the storage capacitor line generates no leaking electric field which may disturb the orientation of liquid crystal molecules in the polymer sustained alignment process. Therefore, the liquid crystal molecules assume an intended normal orientation.

The invention hence advantageously realizes a liquid crystal display device which includes pixel electrodes each of which is provided with a plurality of stripe electrodes separated from each other by a distance, the liquid crystal display device successfully addressing irregular orientation of liquid crystal molecules in polymer sustained alignment.

The liquid crystal display device in accordance with the present invention may be arranged so that: each of the regional electrodes is provided with a second electrode forming an entire periphery of the first region; and the first electrode and the plurality of stripe electrodes of each of the regional electrodes are connected to the second electrode in the periphery.

According to this aspect of the invention, the edges of the regional electrode(s) give less impact on electric field because the edges of the first electrode and the edges of the stripe electrodes are interconnected by the second electrode provided. Accordingly, the liquid crystal molecules near the edges of the regional electrode(s) readily tilt in an intended inclination direction. Therefore, transmission loss decreases, and transmittance grows. Therefore, the irregular orientation on pixel edges is further reduced, which in turn brings about an advantage of further reducing irregular orientation on the whole.

The liquid crystal display device in accordance with the present invention may be arranged so that the storage capacitor line is provided so as to face the first electrode in the film thickness direction.

According to this aspect of the invention, a storage capacitor is advantageously formed between the storage capacitor lines and the first electrode.

The liquid crystal display device in accordance with the present invention may be arranged so that those different ones of the storage capacitor lines which are allocated respectively to two adjacent ones of the pixel electrodes are connected to each other by a connecting wire which passes through an area located facing the two pixel electrodes in the film thickness direction.

According to this aspect of the invention, the provision of the connecting wire in a pixel boundary changes the orientation into which both the liquid crystal molecules in the pixel boundary and those in its surroundings tilt to a predetermined orientation. This in turn brings about an advantage of tilting the liquid crystal molecules into a predetermined orientation in a stable manner.

The liquid crystal display device in accordance with the present invention may be arranged so that the connecting wire is provided so as to face the first electrodes for the two pixel electrodes in the film thickness direction.

According to this aspect of the invention, a storage capacitor is advantageously formed between the connecting wire and the first electrodes.

A liquid crystal display device in accordance with the present invention is a liquid crystal display device of active matrix type, including: a liquid crystal layer; pixel electrodes; a common electrode; and storage capacitor lines, wherein the liquid crystal layer is located between the pixel electrodes and the common electrode, each of the pixel electrodes includes either a single regional electrode or two or more regional electrodes which are electrically connected to each other, the or each regional electrode being provided with: a first electrode which has a pattern dividing a first region where the regional electrode is formed into a plurality of second regions; and a plurality of stripe electrodes which are provided in each of the plurality of second regions so as to extend from the first electrode and so as to be separated from each other by a distance, and each of the storage capacitor lines is provided for one of the pixel electrodes to which that storage capacitor line is allocated to form a storage capacitor, the storage capacitor line being provided with: a first wiring section which extends facing an edge of the first region parallelly to the edge; and a second wiring section which extends from the first wiring section in a direction intersecting with the first wiring section in an area which is located facing the first region.

According to the invention, the provision of the first wiring section and the second wiring section causes the liquid crystal molecules on edges to tilt toward the first wiring section and in contrast, causes those in the peripheral region of the second wiring section to tilt toward the second wiring section. Therefore, the liquid crystal molecules readily tilt in the mid-direction. The liquid crystal molecules, as a whole, readily tilt in an intended direction.

The invention hence advantageously realizes a liquid crystal display device which includes pixel electrodes each of which is provided with a plurality of stripe electrodes separated from each other by a distance, the liquid crystal display device successfully addressing irregular orientation of liquid crystal molecules in polymer sustained alignment.

The liquid crystal display device in accordance with the present invention may be arranged so that the second wiring section is located so as to face the first electrode in the film thickness direction.

According to this aspect of the invention, a storage capacitor is advantageously formed between the storage capacitor lines and the second wiring section.

The liquid crystal display device in accordance with the present invention may be arranged so that: each of the regional electrodes is provided with a second electrode forming a periphery of the first region except for the edge; and the first electrode and the plurality of stripe electrodes of each of the regional electrodes are connected to the second electrode in the periphery.

According to this aspect of the invention, the edges of the regional electrode(s) give less impact on electric field because the edges of the first electrode and the edges of the stripe electrodes are interconnected by the second electrode provided. Accordingly, the liquid crystal molecules near the edges of the regional electrode(s) readily tilt in an intended inclination direction. Therefore, transmission loss decreases, and transmittance grows. In addition, the non-provision of the second electrode on the edge where the first wiring section is provided prevents irregular orientation which could otherwise occur under the influence of the second wiring.

Therefore, the irregular orientation on pixel edges is further reduced, which in turn brings about an advantage of further reducing irregular orientation on the whole.

The liquid crystal display device in accordance with the present invention may be arranged so that the liquid crystal layer contains liquid crystal molecules which have a negative dielectric anisotropy and to which a pretilt angle is imparted by use of a polymer.

According to this aspect of the invention, polymer sustained alignment can be performed without causing irregular orientation of liquid crystal molecules. This in turn brings about an advantageous supplement to insufficient regulation of orientation through electric field, to achieve well-organized orientation.

The liquid crystal display device in accordance with the present invention may be arranged so that: the pattern of the first electrode is a wiring pattern extending in a row direction and in a column direction; and the plurality of stripe electrodes each extend in a direction at an angle to the first electrode.

According to this aspect of the invention, each second region advantageously acts as a domain for MVA driving.

The liquid crystal display device in accordance with the present invention may be arranged so that in those of the plurality of second regions which, in each of the regional electrodes, are adjacent either in the row direction or in the column direction with the first electrode intervening between those second regions, the plurality of stripe electrodes extend in a direction which differs from one second region to another.

According to this aspect of the invention, each second region advantageously acts as an independent domain for MVA driving.

The present invention is not limited to the description of the embodiments and examples above. Proper variations and combinations of the embodiments and examples in view of general technical knowledge are encompassed in the technical scope of the present invention.

INDUSTRIAL APPLICABILITY

The present invention is preferably applicable to active matrix display devices.

REFERENCE SIGNS LIST 1, 31 Pixel Electrode
2, 32 Regional Electrode
3 Cross-shaped Electrode (First Electrode)
4 Stripe Electrode
5, 6 Peripheral Electrode (Second Electrode)
11 Liquid Crystal Display Device
2e, 32e Edge
R1, R2, R3, R4 Region (Second Region)
LC Liquid Crystal Layer
COM Common Electrode
Cs Storage Capacitor
CSL Storage Capacitor Bus Line (Storage Capacitor Line)
CSLc Branch Line Section (First Wiring Section)
CSLb Branch Line Section (Second Wiring Section)
CSLb' Branch Line Section (Connecting Wire)

The invention claimed is:

1. A liquid crystal display device of active matrix type, comprising:
 a liquid crystal layer;
 pixel electrodes;
 a common electrode; and
 storage capacitor lines, wherein
 the liquid crystal layer is located between the pixel electrodes and the common electrode,
 each of the pixel electrodes includes either a single regional electrode or two or more regional electrodes which are electrically connected to each other, each of the regional electrodes being provided with: a first electrode which has a pattern dividing a first region where the regional electrode is formed into a plurality of second regions; and a plurality of stripe electrodes which are provided in each of the plurality of second regions so as to extend from the first electrode and so as to be separated from each other by a distance,
 each of the storage capacitor lines is provided facing one of the pixel electrodes in a film thickness direction, so as not to extend facing an edge of the first region in the film thickness direction parallelly to the edge, the storage capacitor line being allocated to that pixel electrode to form a storage capacitor,
 each of the regional electrodes is provided with a second electrode forming an entire periphery of the first region, and
 the first electrode and the plurality of stripe electrodes of each of the regional electrodes are connected to the second electrode in the periphery.

2. The liquid crystal display device as set forth in claim 1, wherein the storage capacitor line is provided so as to face the first electrode in the film thickness direction.

3. The liquid crystal display device as set forth in claim 1, wherein those different ones of the storage capacitor lines, which are allocated respectively to two adjacent ones of the pixel electrodes, are connected to each other by a branch line overlapping the two pixel electrodes in the film thickness direction.

4. The liquid crystal display device as set forth in claim 3, wherein the branch line is provided so as to face the first electrodes for the two pixel electrodes in the film thickness direction.

5. The liquid crystal display device as set forth in claim 1, wherein the liquid crystal layer contains liquid crystal molecules which have a negative dielectric anisotropy and to which a pretilt angle is imparted by use of a polymer.

6. The liquid crystal display device as set forth in claim 1, wherein:
 the pattern of the first electrode is a wiring pattern extending in a row direction and in a column direction; and
 each of the plurality of stripe electrodes extends in a direction at an angle to the first electrode.

7. The liquid crystal display device as set forth in claim 6, wherein in those of the plurality of second regions which, in each of the regional electrodes, are adjacent either in the row direction or in the column direction with the first electrode intervening between those second regions, the plurality of stripe electrodes extend in a direction which differs from one second region to another.

8. A liquid crystal display device of active matrix type, comprising:
 a liquid crystal layer;
 pixel electrodes;
 a common electrode; and
 storage capacitor lines, wherein
 the liquid crystal layer is located between the pixel electrodes and the common electrode,
 each of the pixel electrodes includes either a single regional electrode or two or more regional electrodes which are electrically connected to each other, each of the regional electrodes being provided with: a first electrode which has a pattern dividing a first region where the regional electrode is formed into a plurality of second regions; and a plurality of stripe electrodes which are provided in each of the plurality of second regions so as to extend from the first electrode and so as to be separated from each other by a distance, and
 each of the storage capacitor lines is provided for one of the pixel electrodes to which that storage capacitor line is allocated to form a storage capacitor, the storage capacitor line being provided with: a first wiring section which extends facing an edge of the first region parallelly to the edge; and a second wiring section which extends from the first wiring section in a direction intersecting with the first wiring section in an area which is located facing the first region.

9. The liquid crystal display device as set forth in claim 8, wherein the second wiring section is located so as to face the first electrode in the film thickness direction.

10. The liquid crystal display device as set forth in claim 8, wherein:
 each of the regional electrodes is provided with a second electrode forming a periphery of the first region except for the edge; and
 the first electrode and the plurality of stripe electrodes of each of the regional electrodes are connected to the second electrode in the periphery.

11. The liquid crystal display device as set forth in claim 8, wherein the liquid crystal layer contains liquid crystal molecules which have a negative dielectric anisotropy and to which a pretilt angle is imparted by use of a polymer.

12. The liquid crystal display device as set forth in claim 8, wherein:
 the pattern of the first electrode is a wiring pattern extending in a row direction and in a column direction; and
 each of the plurality of stripe electrodes extends in a direction at an angle to the first electrode.

13. The liquid crystal display device as set forth in claim 12, wherein in those of the plurality of second regions which, in each of the regional electrodes, are adjacent either in the row direction or in the column direction with the first electrode intervening between those second regions, the plurality of stripe electrodes extend in a direction which differs from one second region to another.

\* \* \* \* \*